United States Patent [19]
Hoffman

[11] 3,905,242
[45] Sept. 16, 1975

[54] AUXILIARY BICYCLE BRAKE ARRANGEMENT

[76] Inventor: William B. Hoffman, 67 Ships Point Ln., Oyster Bay, N.Y. 11771

[22] Filed: Jan. 15, 1974

[21] Appl. No.: 433,548

[52] U.S. Cl. .................................. 74/480 R; 74/489
[51] Int. Cl.².. B62K 23/06; B62L 3/02; G05G 9/00
[58] Field of Search .......................... 74/480 R, 489

[56] References Cited
UNITED STATES PATENTS

| | | | |
|---|---|---|---|
| 3,403,577 | 10/1968 | Ozaki | 74/480 |
| 3,596,530 | 8/1971 | Yoshigai | 74/489 |
| 3,719,104 | 3/1973 | Dian | 74/489 |
| 3,760,648 | 9/1973 | Hoffman | 74/489 |

*Primary Examiner*—Allan D. Herrmann
*Attorney, Agent, or Firm*—Frank J. Jordan

[57] ABSTRACT

A braking device for use on a racing bicycle handle of the type having a cross bar and handle portions at the ends of the crossbar extending generally transversely of the crossbar and on which pivotal brake handle levers are mounted which includes auxiliary brake means extending adjacent to the crossbar. The auxiliary brake means is mounted so as to provide a relatively movable connection with the brake handle lever, whereby the auxiliary brake means may be grasped by a rider to apply the brakes while the rider has his hands on the crossbar or other locations of the bicycle handle and the pivotal mounting of the auxiliary brake means on the brake handle levers ensures application of equalized pressure on both of the brake handle levers.

2 Claims, 8 Drawing Figures

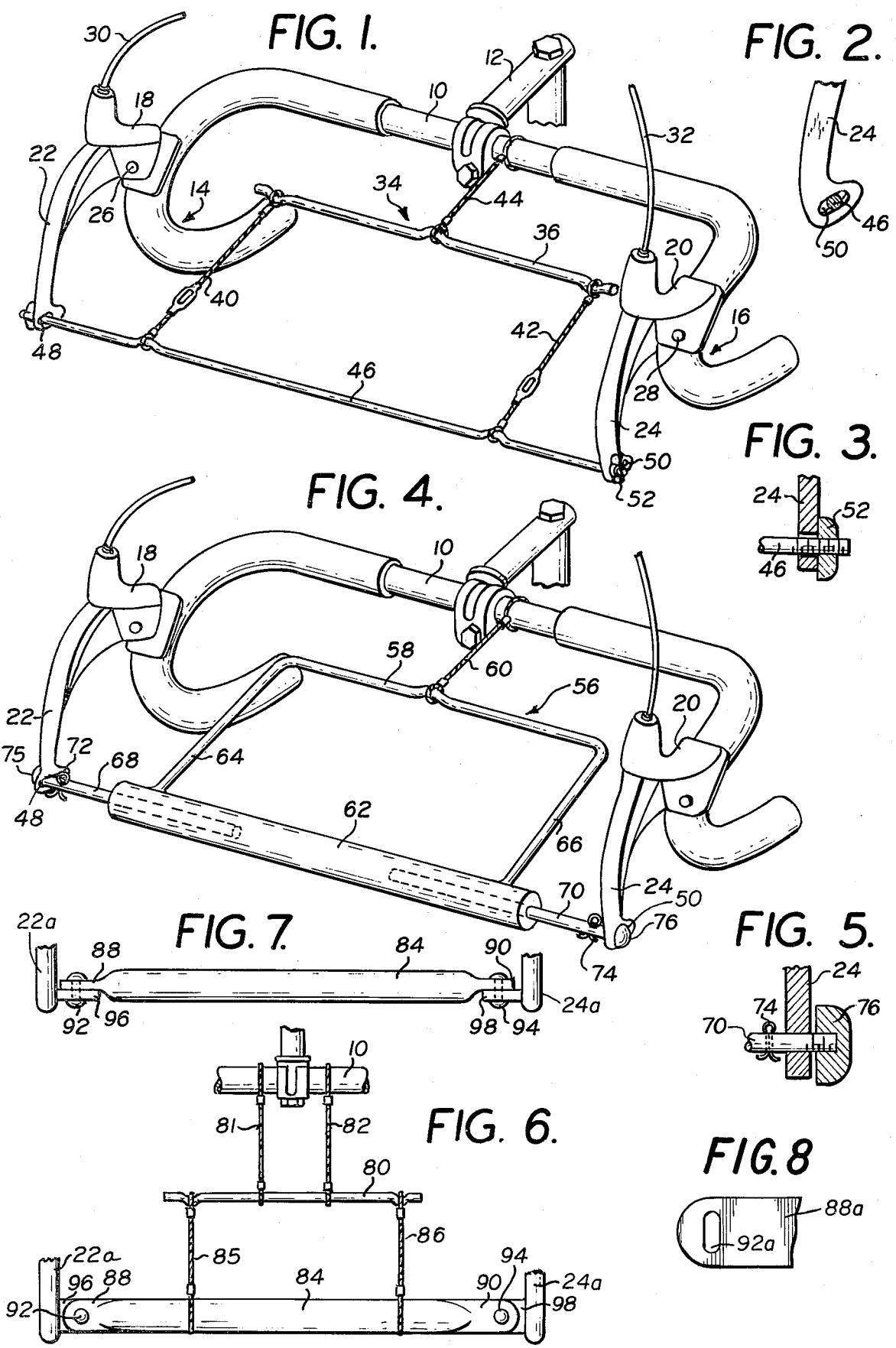

AUXILIARY BICYCLE BRAKE ARRANGEMENT

BACKGROUND OF THE INVENTION

In U.S. Patent Application Ser. No. 392,568 filed on Aug. 29, 1973, now U.S. Pat. No. 3,835,724 issued Sept. 17, 1974, in the name of William B. Hoffman (who is also the applicant in the instant patent application) there is disclosed an auxiliary brake means including a flexibly mounted auxiliary brake means on the brake handle levers. The flexible mounting means is in the form of a wire, cable, leather thong or the like which is attached to the levers. The aforementioned patent application utilizes the wires, cables or leather thongs to ensure that there will be a connection between the brake levers and the auxiliary brake handle which will provide rotational movement between the rigid crossbar, which is grasped by the rider to apply the brakes on the auxiliary brake device, and the brake levers. The reason for this flexible connection was to insure that equal brake pressure would be applied to both brakes.

According to the present application, the flexible connection between the brake levers and the auxiliary brake device may be provided by means other than by a wire, cable, leather thong or the like. Accordingly, an object of the present invention is to overcome the disadvantages of known prior art arrangements and provide a connection between the brake levers of a bicycle and an auxiliary brake lever which will ensure that equalized pressure will be applied to both brake levers as the auxiliary brake is applied.

Another object of the present invention is to provide an auxiliary brake lever which may be readily and conveniently operated from various positions on the bicycle handle and which may be grasped by the rider by extending the fingers of one or both hands while also ensuring that equalized pressure is applied to both brake levers.

Another object of the present invention is to provide an inexpensive and easily installed auxiliary brake device.

A further object of the present invention is to provide an arrangement between an auxiliary brake and the brake levers which provides for flexibility whereby both brakes may be applied independently of the differences in required pivotal movement of each brake lever when the brakes are applied.

Other features which are considered as characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a perspective view of a drop handle as used on a racing bicycle and showing an auxiliary brake according to one embodiment of the present invention.

FIG. 2 is a partial side view of the brake lever shown in FIG. 1.

FIG. 3 is a partial sectional view of the brake lever and the bar element which passes through an elongated slot in the brake lever.

FIG. 4 is a perspective view of a drop handle and auxiliary brake according to another embodiment of the invention.

FIG. 5 is a partial end view of the brake lever and the connection of the latter to an auxiliary brake lever.

FIG. 6 is a partial plan view of an auxiliary brake device according to a further alternate embodiment of the invention.

FIG. 7 is an elevational view of the auxiliary brake shown in FIG. 6.

FIG. 8 is a partial plan view of the flat end of the cross member shown in FIGS. 6 and 7 but showing a slot according to a further alternative arrangement.

DESCRIPTION OF THE PREFERRED EMBODIMENTS

Before explaining the present invention in detail, it is to be understood the invention is not limited in its application to the details of construction and arrangement of parts illustrated in the accompanying drawings, since the invention is capable of other embodiments and of being practiced or carried out in various ways. Also, it is to be understood that the phraseology or terminology is for the purpose of description and not of limitation.

Referring to the drawings, FIG. 1 shows a conventional drop handle having a straight rod section or cross bar 10 secured to the fork 12 of a bicycle. U-shaped handle sections 14 and 16 are carried on the longitudinal ends of the cross bar 10. Support brackets 18 and 20 are secured to the U-shaped handle sections 14, 16 and pivotally mounted brake levers 22 and 24 extend from the brackets 18 and 20 respectively. It will be noted that the brake levers 22, 24 are located such that they may be readily grasped to apply the brakes when the rider has his hands on the U-shaped handle sections 14 and 16. The brake levers 22, 24 are pivoted at 26, 28 to actuate wire connectors 30, 32 which actuate braking elements (not shown) in a known manner.

An auxiliary brake handle means 34 is located to permit the brakes to be readily applied when the rider has his hands on the top of the handle bar 10 of the bicycle. The auxiliary handle means 34 comprises a cross member 36 which is supported, by means to be described, so that the cross member 36 is disposed parallel to the handle bar 10 so that a rider who has his hands on the handle bar 10 may readily extend his fingers to grasp the cross member 36 to pull the latter toward him and thereby apply the brakes.

The cross member 36 is supported by three flexible means 40, 42 and 44 such as wires, cables, or leather thongs. Thus, the end portions of the cross member 36 are supported by the flexible means 40 and 42 each of which is attached to a rigid member or bar element 46.

The bar element 46 extends between the two brake levers 22, 24. The end portions of the brake levers 22, 24 have elongated slots 48, 50 respectively in which the end portions of the bar element 46 are received. An attachment means such as the nuts 52 may be engaged on the threaded end portions of the bar element 46. The nuts 52 merely prevent the bar element 46 from coming out of the elongated slots 48, 50.

With the above arrangement, it will be seen that a rider who is riding a bicycle with his hands on the top of the bar 10 can readily, by means of his fingers, apply the front and rear brakes quickly without having to move his arms or change position of his hands.

By utilizing the elongated slots 48, 50 in the end portions of the brake levers 22, 24, equalized braking pressure will be applied on the braking levers 22, 24 when the rider grasps the auxiliary handle or cross member 36. Thus, if one brake lever 22 or 24 requires a greater pivotal movement about its pivot 26 or 28 respectively before the brake grabs, the bar element 46 will pivot about the brake lever 22 or 24 having the lesser pivotal movement requirement until the other brake lever grabs, thereby providing equalized braking pressure on both brake leverage 22, 24. Expressed otherwise, the mounting of the bar element 46 in elongated slots on the brake levers 22, 24 provides for equalized pressure on both brake levers 22, 24 when the brakes are applied through the auxiliary handle or cross member 36. Thus, both brakes can be activated by grasping the cross member 36 with one hand. In this regard it is pointed out that when one of the brakes wears more than the other, the brake lever controlling the brake which has worn the most will require a greater pivotal movement. Accordingly, in order to insure safety and application of equal pressure on both brakes, the provision of the elongated slots 48, 50 in the brake levers 22, 24 insures that such equal braking pressure will be applied even as one brake wears more than the other.

FIG. 4 shows an alternate embodiment comprising a U-shaped rod element 56. The handle part 58 of the U-shaped rod element 56 is supported on the cross bar 10 by a wire, cable, or leather thong 60. A tube 62 is fixed to the ends of the legs 64, 66 of the U-shaped rod element 56 such as by welding or the like. Rigid members or rods 68 and 70 are slidably and adjustably disposed in the longitudinal ends of the tube 62 and these rods 68, 70 extend coincident with the longitudinal axis of the tube 62 where they are received in the elongated slots 48, 50 in the end of the brake levers 22, 24 respectively. The longitudinal ends of the rods 68, 70 may be provided with attachment means such as nut-like elements 75, 76 threadedly engaging the threaded end portions of the rods 68, 70 respectively. The elements 75, 76 prevent the rods 68, 70 from being pulled out of the elongated holes 48, 50 in the brake levers 22, 24 respectively. Suitable fastening means such as cotter pins 72, 74 are provided in the rods 68, 70 adjacent the brake levers 22, 24 respectively to preclude longitudinal displacement of the rods 68, 70 relative to the brake levers 22, 24. Thus the rods 68, 70 are free to rotate, and excess torque will not be brought to bear on the rods 68, 70 and tube 62 while the brakes are applied.

It will be apparent that the embodiment of FIG. 4 operates in a manner similar to that in FIG. 1 wherein the elongated slots 48, 50 in the brake levers 22, 24 respectively provide the flexible connection between the brake levers 22, 24 and the auxiliary brake means to thereby provide equalized braking pressure on both brake levers 22, 24.

FIGS. 6 and 7 relate to further alternate embodiment showing a handle element 80 secured to the cross bar 10 by the flexible means 81 and 82 such as wires, cables, or leather thongs. The handle element 80 is in turn supported from a rigid cross member 84 by means of additional flexible means 85, 86 such as wires, cables, or leather thongs. The cross member 84 is pivotally supported from the ends of the brake levers 22a and 24a. Thus, the cross member 84 has flat ends 88, 90 having openings and adapted to receive pins 92, 94 respectively. Suitable laterally extending flange elements 96, 98 respectively are provided on the brake levers 22a, 24a respectively and these flange elements 96, 98 have openings aligned with the opening in the flattened ends 88, 90 of the cross member 84. Accordingly, the pins 92, 94 provide a pivotal connection between the cross member 84 and the brake levers 22a, 24a. Thus, if one brake lever 22a or 24a requires a greater pivotal movement about its pivot pin 92 or 94 before the brake grabs, the cross member 84 will pivot about the pivot pin 92 or 94 having a greater pivotal movement requirement until the both brake levers 22a and 24a grab, thereby providing equalized braking pressure on both brake levers 22a, 24a. Equalization of movement will be further enhanced by the fact that the cross member 84 will revolve underneath the wires 85 and 86. The slots through which pivot pins 92 and 94 pass may also be elongated. For example in FIG. 8 an elongated slot 92a is shown in the flat end 88a of the cross member. The pivotal mounting of the cross member 84 on the brake levers 22a, 24a and the turning of the cross member 84 provides equalized pressure on both brake levers when the brakes are applied through the auxiliary braking device or rod element 80.

While the invention has been described by means of specific examples and in specific embodiments, it is not intended to be limited thereto, for obvious modifications will occur to those skilled in the art without departing from the spirit and scope of the invention.

What is claimed is:

1. A braking device for use on a racing bicycle handle of the type having a crossbar and handle portions at the ends of the crossbar extending generally transversely of the crossbar and on which pivotal brake handle levers are mounted, comprising an auxiliary brake handle means extending parallel to said crossbar, said auxiliary brake means including at least one rigid element in the form of a cross member, means providing for a relatively movable connection between said cross member and said pivotal brake handle levers, said means including lateral flange elements on said pivotal brake handle levers and pivot pins pivotally connecting said cross member to said lateral flange elements, whereby the auxiliary brake handle means may be grasped by a rider to apply the brakes while the rider has his hands on the crossbar or other locations of the bicycle handle and the movable mounting means of said rigid element on the brake handle levers insures application of equalized pressure on both of said pivotal brake handle levers.

2. A braking device according to claim 1. wherein said pivot pins pass through elongated slots.

* * * * *